United States Patent [19]

Cornu et al.

[11] 4,413,910
[45] Nov. 8, 1983

[54] SYSTEM FOR DETECTING AND LOCATING SURFACE DISCONTINUITY BY A LIGHT BEAM

[75] Inventors: Jean Cornu, Nantes; Jean-Marie Detriche, Chambourcy; Bernard Tiret, Verdun; Gérard Jorge, Lunel; Richard Galera, Meylan; Dominique Biava, Clamart; Paul Marchal, Gif-sur-Yvette, all of France

[73] Assignee: Commissariat a l'Energie Atomique, Paris, France

[21] Appl. No.: 234,361

[22] Filed: Feb. 13, 1981

[30] Foreign Application Priority Data

Feb. 12, 1980 [FR] France ................................. 80 03068

[51] Int. Cl.³ ............................................. G01B 11/24
[52] U.S. Cl. ..................................... 356/377; 250/202
[58] Field of Search ................ 356/377, 375; 250/561, 250/202

[56] References Cited

U.S. PATENT DOCUMENTS

| Re. 30,938 | 5/1982 | Kallen ................................. 250/202 |
| 2,499,178 | 2/1950 | Berry et al. ......................... 250/202 |
| 3,518,514 | 6/1970 | Moss ................................... 250/202 |
| 3,527,953 | 9/1970 | Chitayat ............................. 250/561 |
| 3,609,237 | 9/1971 | Gerber ................................ 250/202 |
| 3,881,102 | 4/1975 | Willits et al. ....................... 250/202 |

OTHER PUBLICATIONS

Norrie et al., "An Automatic Digital Curve Reader", Jr. Sci. Instrum., 1965, pp. 356–357.

Primary Examiner—William H. Punter
Attorney, Agent, or Firm—Kerkam, Stowell, Kondracki & Clarke

[57] ABSTRACT

The invention relates to a system for detecting and locating surface discontinuity by a light beam; it is more particularly intended for detecting any discontinuity forming a line on this surface, or any discontinuity forming two opposite lines on this surface. In the latter case, this discontinuity may, for example, be the join defined by the opposite edges of two metal sheets to be welded.

9 Claims, 12 Drawing Figures

SYSTEM FOR DETECTING AND LOCATING SURFACE DISCONTINUITY BY A LIGHT BEAM

The present invention relates to a system for detecting and locating surface discontinuity by a light beam; it is more particularly intended for detecting any discontinuity forming a line on this surface, or any discontinuity forming two opposite lines on this surface. In the latter case, this discontinuity may, for example, be the join defined by the opposite edges of two metal sheets to be welded.

The system of detection of the invention makes it possible to determine the outline of a surface discontinuity with respect to a reference coordinate system, with considerable accuracy; it may be intended for equipping self-adapting welding heads which must automatically follow a join to be welded; however, this system may, of course, also equip all industrial robots which must follow precise outlines.

The development of robotics corresponds to the necessity of increasing production in all industrial domains where the use of special machines is not necessary; this development also corresponds to the reduction of the organisation and planning restraints in small- and medium-scale production. Finally, robotics enables investments to be reduced by using adaptable machines which replace special machines intended for treating the same product on a large scale. Robotics also solves problems caused by technical difficulties or by unhealthy or dangerous jobs; industry needs these developed handling, manipulating or manufacturing means. In particular, arc welding, with or without filler metal, today raises numerous specific problems which make it necessary to develop robots adapted to this technique. In the domain of welding, it is often necessary to effect follow-up of the join to be welded between two sheets, with very high precision, quickly and in reproducible manner. In fact, it is known that, to assemble a large number of elements by welding, with very high precision, without possibility of re-run or error, requires highly qualified manpower of which there is a shortage. It is often impossible to ensure intensive production due to the fatigue and physical stress resulting from the precision demanded. When the pieces to be welded are of very large dimensions, it is often necessary that they be preheated before being welded, this obliging the welder to wear special protective clothing to approach them. This results in unhealthy and dangerous working conditions. When welding is effected between heat-deformable elements, not all special welding machines programmed to a very precise path can be adapted to these deformations which may reach several centimeters in certain cases.

In numerous industrial domains using robotics, it is therefore necessary to have systems for detecting surface discontinuity enabling robots which must follow this discontinuity to be controlled with very high precision.

In the present state of the art, no system for detecting discontinuity is known which is simple to make and which enables the outline of this discontinuity to be determined, with high precision, with respect to a system of reference coordinates.

It is an object of the present invention to remedy these drawbacks and in particular to provide a system for detecting discontinuity which is simple to use and which determines the form of this discontinuity with high precision.

The invention relates to a system for detecting and locating surface discontinuity by a light beam, characterised in that it comprises:
  a detector comprises means for emitting a convergent incident beam of monochromatic light, in the direction of the discontinuity, means for receiving the light reflected on the surface and an optoelectric transducer for the reflected light, associated with the receiving means;
  means for displacing the detector so that the incident beam transversely scans the discontinuity and the vicinity thereof;
  a carrier adapted to move the means for displacing the detector, along the discontinuity, this carrier being associated with means for locating its position with respect to a fixed system of coordinates;
  locating means, connected to the receiving means of the detector, for locating the successive angular positions of this detector, with respect to a reference direction associated with the carrier when this carrier occupies different positions along the discontinuity and when the incident beam passes over the discontinuity.

According to a further feature of the invention, the means for locating each angular position of the detector comprise means for determining the angular position of the detector with respect to said reference direction, each time the incident beam passes through a point located on the discontinuity.

According to another feature, the means for determining the angular position of the detector each time the incident beam passes through a said point located on the discontinuity, comprise means for recording each pulse coming from the optoelectronic transducer and means for recording, for each of these pulses, the value of the angle between a detector position locating line and said reference direction, this detector position locating line passing through a determined point of the carrier and through a point of the detector, characteristic of the position of the detector.

According to a further feature, the discontinuity being defined by two opposite lines, the means for locating each angular position of the detector comprise means for determining the angular position of the detector with respect to said reference direction, each time the incident beam passes through a point located in the space separating the two lines defining the discontinuity.

According to yet another feature of the invention, the means for recording each pulse from the detector comprise a circuit for shaping these pulses.

According to another feature, the shaping circuit comprises a high gain amplifier, associated with an assembly for filtering the background noise accompanying these pulses.

According to a further feature, the filtering assembly comprises at least one filter associated with means for comparing the output signal from this filter with a floating reference D.C. voltage corresponding to the mean level of the signal leaving the filter.

According to a further feature, the means for determining the angular position of the detector, each time the incident beam passes through a point located between and at equal distance from the two lines defining the discontinuity, comprise means for recording each pulse coming from the optoelectronic transducer, these pulses having a duration corresponding to the passage of the incident beam in the space separating the two lines defining the discontinuity, means for measuring the duration of each of these pulses, means for indicating the instant which corresponds to half of this duration and therefore to the passage of the incident beam through a point located between and at equal distance from the two lines defining the discontinuity, and means for recording at that instant the value of the angle between a line for locating the position of the detector and said reference direction, this position locating line passing through a determined point of the carrier and through a point of the detector, characteristic of the position of the detector.

According to another feature, the means for measuring the duration of each pulse of the transducer and for indicating the instant corresponding to half this duration, comprises a clock associated with a counter and with a logic circuit controlling the counting of the clock pulses for the duration of each pulse of the transducer, an output of this counter delivering a binary signal corresponding to half the number of the clock pulses counted during said duration.

According to a further feature, the means for measuring the duration of each pulse and for indicating the instant corresponding to half this duration further comprise a register adapted to record the binary signal corresponding to half the number of the clock pulses counted during said duration and a comparator receiving, on the one hand, the contents of the register and, on the other hand, the following binary signal issuing from the counter and corresponding to the clock pulses counted during the duration of the following pulse, for another passage of the incident beam of the detector, in the space separating the two lines defining the discontinuity, an output of this comparator delivering a pulse controlling the means for recording the value of said angle.

According to another feature, the detector is fixed to an arm mobile with respect to the carrier, this arm being controlled by said displacement means and having such a form that the detector is located on a line passing through said point characteristic of the position of the detector and through said determined point of the carrier, this arm further being associated with the means for recording said angle.

According to another feature, the means for emitting the incident beam comprise a laser source, means for focusing the beam emitted by the source, an optic fibre associated with these focusing means and adapted to direct the focused beam at a constant angle of incidence, in the vicinity of the or each line defining the discontinuity, the receiving means comprising means for focusing the reflected light corresponding to the incident beam, and an interferential filter interposed between the surface and the optoelectronic transducer, the optic axis of the means for focusing the reflected light from the interferential filter and the transducer presenting an angle of reflexion equal to the angle of incidence.

According to a further feature, the system further comprises an optic fibre for transmitting the reflected light.

The invention will be more readily understood on reading the following description with reference to the accompanying drawings, in which:

FIG. 1 schematically shows a system according to the invention for detecting surface discontinuity; in the embodiment shown in this Figure, the discontinuity forms a line on the surface.

FIG. 2 schematically shows a system according to the invention for detecting surface discontinuity; in the embodiment shown in this Figure, the discontinuity is formed by two lines on the surface.

FIG. 3 schematically shows the detector of the detection system according to the invention; at (a), this detector is offset with respect to the discontinuity to be detected; at (b), the detector is opposite this discontinuity; it is assumed in this figure that the discontinuity is defined by two lines.

Figure 8:
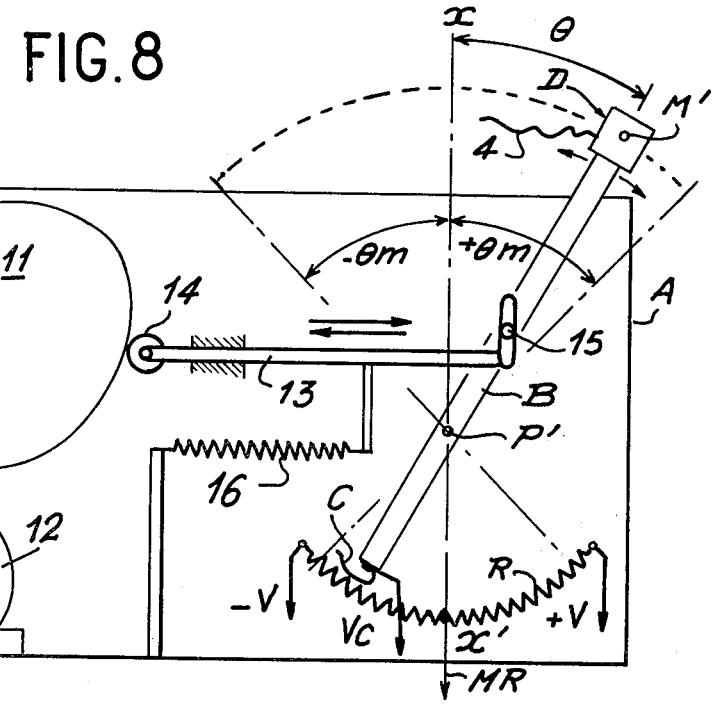

FIG. 8 schematically illustrates an embodiment of the means for displacing the detector, in a reciprocating movement, in a transverse direction with respect to the discontinuity.

Figure 9:
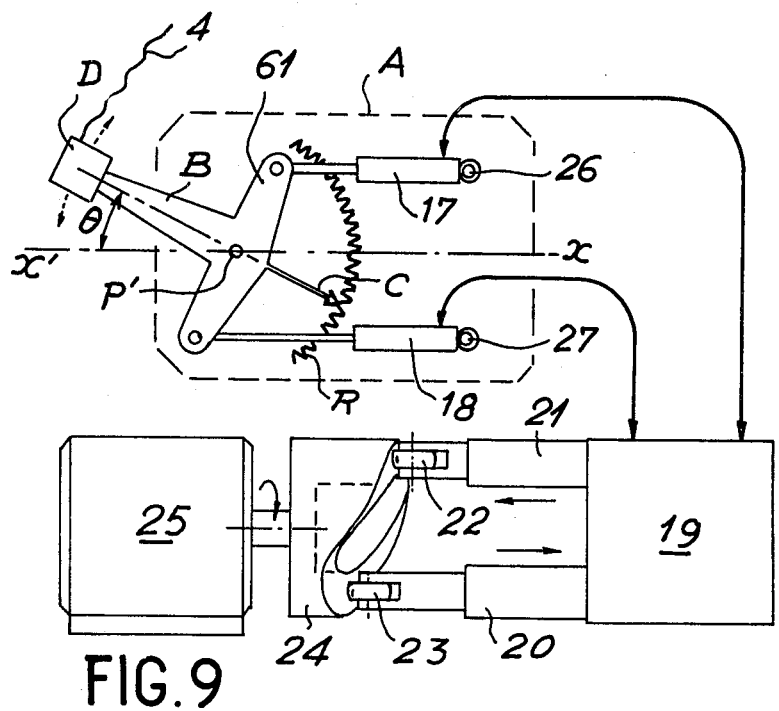
Figure 10:
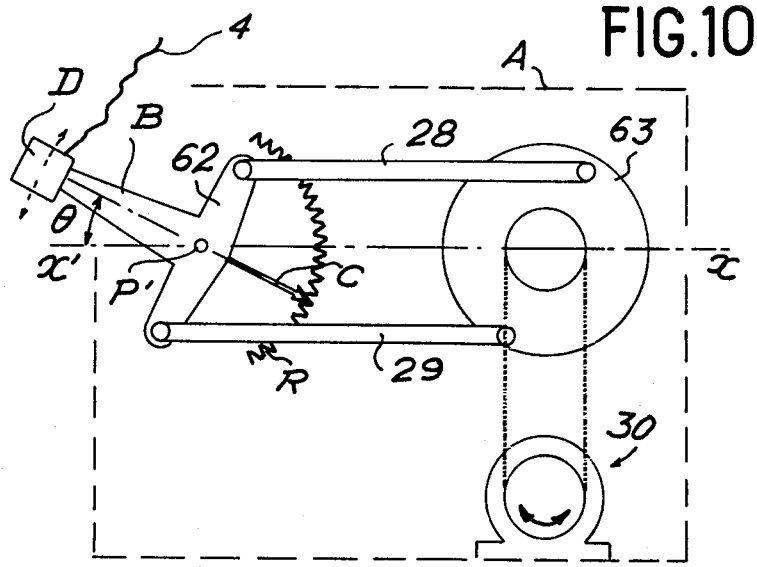

FIGS. 9 and 10 schematically illustrate other embodiments of the preceding means.

Figure 11:
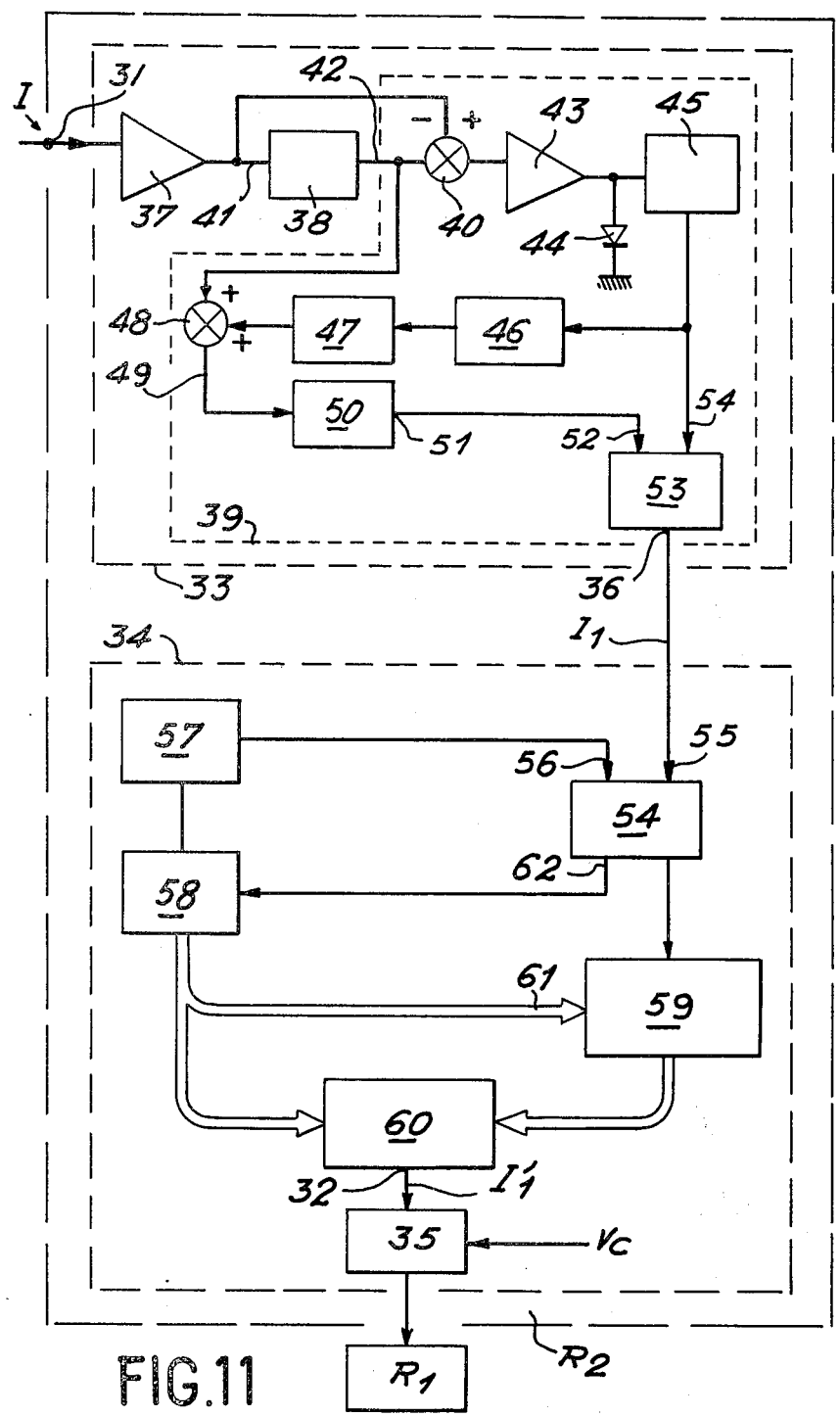

FIG. 11 schematically shows the means in the system for determining the position of the detector with respect to the fixed reference direction, when the discontinuity is defined by two lines and the incident beam of the detector passes through a point located between and at equal distance from the lines defining this discontinuity.

Figure 12:
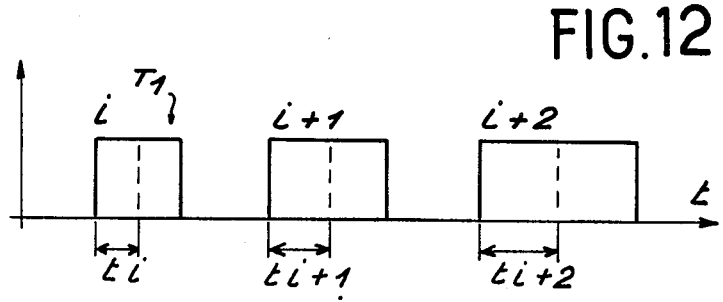

FIG. 12 shows a signal obtained at a particular point of the system when the latter moves along the discontinuity.

Figure 1:
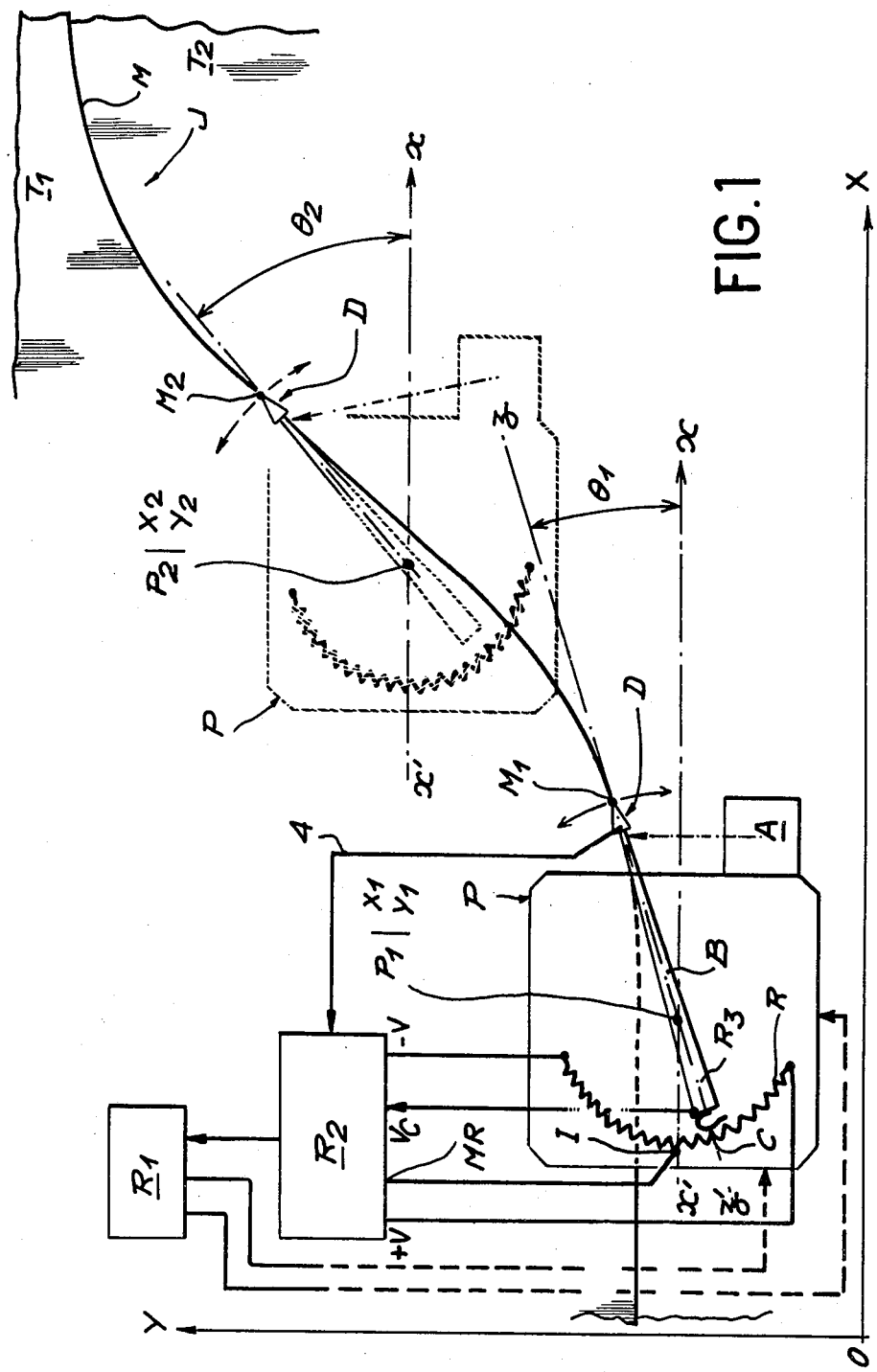

Referring now to the drawings, FIG. 1 shows a system of detection according to the invention, enabling a surface discontinuity to be detected; in the embodiment shown in the Figure, this discontinuity forms a line M defining two portions, $T_1$ and $T_2$ of this surface. The system of the invention comprises a detector D which will be described in detail hereinafter; this detector comprises means for emitting a convergent incident beam of monochromatic light, in the direction of the discontinuity, and means for receiving the light reflected on the surface, as well as an optoelectronic transducer for this reflected light. The detector is carried by an arm B which enables it to be displaced in a reciprocating movement, transversely with respect to the line M representing the discontinuity. This reciprocating movement is controlled by means A which will be described in detail hereinafter. The displacement means A are associated with a carrier P, capable of moving along the discontinuity, under the action of position change control means $R_1$. The position changes of the carrier are made by the combination of two rectilinear movements respectively parallel to two fixed reference directions OX, OY. The position change control means $R_1$ also comprise means for locating each position of the carrier with respect to the two coordinate reference axes OX, OY. These means for displacing and locating the position of the carrier are constituted in known manner and are not described here in detail. In the example described in the Figure, it is assumed that, due to the action of the position change and locating means, the carrier passes from the position $P_1$, of coordinates $X_1$, $Y_1$ to the position $P_2$ of coordinates $X_2$, $Y_2$. The system of the invention also comprises means $R_2$, $R_3$ which enable the successive positions $\theta_1$, $\theta_2$ of the detector D with respect to a reference direction $x'x$, connected with the carrier when the latter occupies different positions such as $P_1$, $P_2$ along the discontinuity and when the incident beam transversely scans this discontinuity, to be located and recorded. As will be seen hereinbelow, these locating means $R_2$, $R_3$ are connected to the receiving means of the detector. The locating means $R_2$, $R_3$ comprise, in particular, means which make it possible to determine the position of the detector with respect to the reference direction $x'x$, each time the incident beam passes through a point located on the line M representing the discontinuity. In the embodiment described, the locating means $R_2$ enable the positions $\theta_1$, $\theta_2$ of the detector, when the incident beam of the detector passes respectively through points $M_1$, $M_2$, to be located. The means A which displace the detector so that the incident beam scans the discontinuity and the vicinity thereof, transversely, are of course associated with the carrier; it is obvious that, in the course of the displacement of the carrier P along the discontinuity, the locating of the angular positions $\theta_1$ and $\theta_2$ of the detector, with respect to the reference direction $x'x$, is made in register with the coordinates $X_1$, $Y_1$, $X_2$, $Y_2$ of the successive positions $P_1$ and $P_2$ of the carrier. As will be seen hereinafter, the receiving means of the detector D are connected to an optoelectronic transducer which delivers a pulse each time the incident beam of convergent light emitted by the detector passes over the discontinuity represented by line M. The means $R_2$, $R_3$ which determine the position of the detector will be described hereinafter in greater detail; they comprise means for recording each pulse coming from the detector; each of these pulses corresponds to the passage of the incident beam through a point located on line M; finally, the means which determine the position of the detector comprise means for measuring and for recording at each instant the value of the angle $\theta$ between the line $Z'Z$ locating the detector and the reference direction $x'x$. The value of this angle may easily be measured due to a potentiometer R with mobile slider C supplied symmetrically by sources of voltage of equal but opposite values $+V$ and $-V$, with respect to the centre point I of the potentiometer, connected to reference earth MR. The means $R_2$ which determine the position of the detector each time the incident beam passes over the discontinuity will be described in detail hereinafter.

Figure 2:
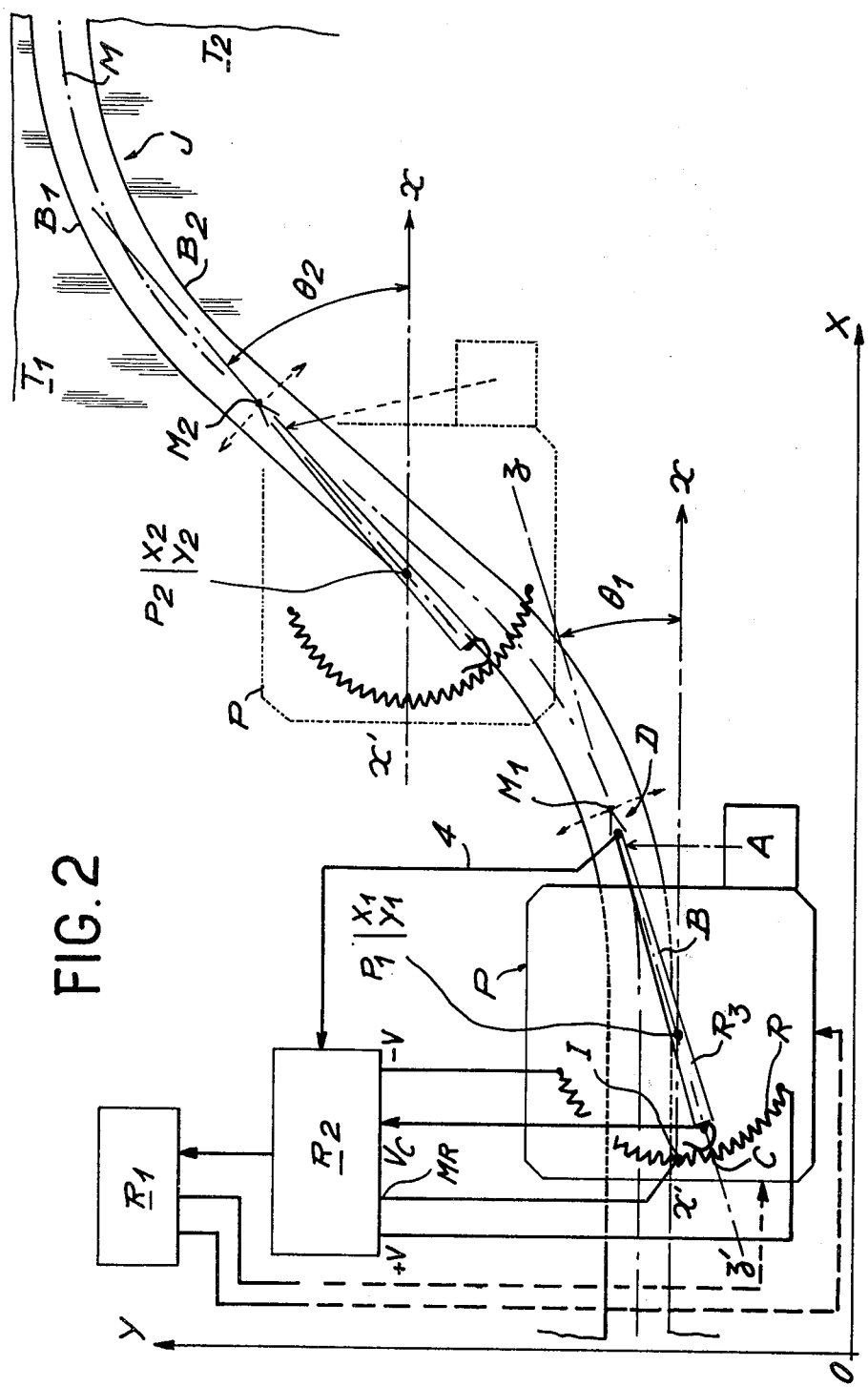

FIG. 2 shows a system of detection according to the invention, for detecting a discontinuity J on a surface, when this discontinuity is defined on this surface by two lines $B_1$, $B_2$ opposite each other. It may be constituted by the join to be welded between the edges of two sheets $T_1$, $T_2$. The same references designate like elements in this Figure and in FIG. 1.

As indicated in FIG. 1, the system of the invention comprises in particular means $R_2$, $R_3$ which locate and record the successive positions $\theta_1$, $\theta_2$ of the detector D with respect to a reference direction $x'x$, associated with the carrier when the latter occupies different positions, such as $P_1$, $P_2$ along the discontinuity and when the incident beam passes between the lines $B_1$, $B_2$ defining this discontinuity. As will be seen hereinafter, the locating means $R_2$, $R_3$ comprise in particular means which determine the position of the detector with respect to the reference direction $x'x$, each time the incident beam passes through a point located between and at equal distance from the two lines $B_1$, $B_2$. As will be seen hereinafter, the receiving means of the detector D are connected to an optoelectronic transducer which delivers a pulse each time the incident beam of convergent light emitted by the detector passes over lines $B_1$, $B_2$ which define the discontinuity. The means $R_1$, $R_2$ which determine the position of the detector will be described hereinafter in greater detail; they comprise means for recording each pulse coming from the detector and for measuring the duration of each of these pulses and means for indicating the instant which corresponds to half of this duration and therefore to the passage of the incident beam through the point located between and at equal distance from the lines $B_1$, $B_2$. The means $R_2$ which determine the position of the detector each time the incident beam passes over the discontinuity will be described in detail hereinafter.

Figure 3:
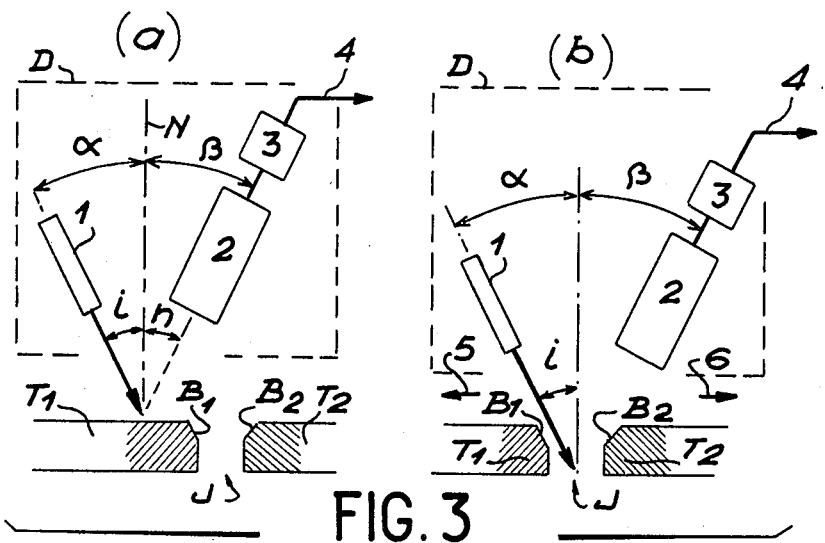

FIG. 3 shows a detector D of the detection system according to the invention; at (a), the detector is offset with respect to the discontinuity J to be detected; at (b), the detector is opposite the discontinuity. It is assumed in this Figure that the discontinuity is defined by two lines, but it is obvious that it may be formed by a single line. The detector comprises means 1 for emitting a convergent incident beam of monochromatic light, in the direction of the surface $T_1$, $T_2$ and means 2 for receiving and focusing the light reflected on the surface, associated with an optoelectronic transducer 3 for this reflected light. This optoelectronic transducer delivers on its output 4 electric signals whose amplitude depends on the intensity of the reflected light collected by the receiving means 2. As will be seen in detail hereinafter, the signals delivered by the transducer 3 are pulses whose duration indicates the distance between the lines $B_1$, $B_2$ which define the discontinuity J. The detector D is, of course, as has been indicated hereinabove, animated by a reciprocating movement, of direction parallel to the surface $T_1$, $T_2$; the direction of this reciprocating movement is indicated by arrows 5 and 6. The means for emitting and receiving the light beam are disposed symmetrically with respect to the normal n to the plane of the sheets ($\alpha = \beta$). It is obvious that the intensity of the reflected light, collected by the receiving means 2 presents a minimum when the incident beam passes over the discontinuity J, i.e. when the detector D occupies the position shown at (b) in FIG. 3. This reflected light would also present a minimum if the discontinuity were constituted by a single line. The means for emitting and receiving (1 and 2, respectively) the light are disposed so that the angle i made by the incident beam with the normal n to the surface is equal to the angle of reflexion r made by the beam of reflected light with this normal n, when the incident beam is reflected by one of the sheets.

Figure 4:
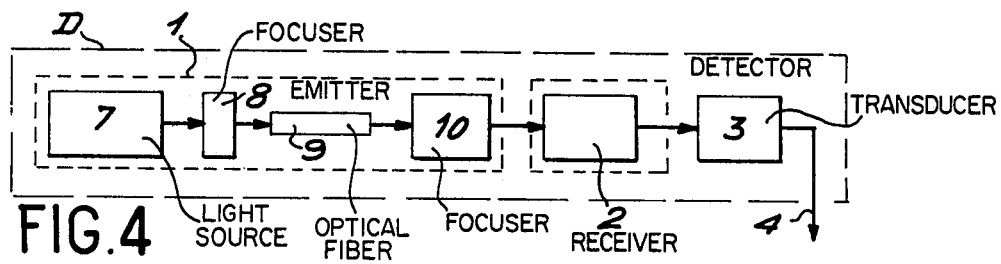
FIG. 4 is a block diagram of the detector belonging to the system of the invention.

FIG. 4 is a block diagram of the detector D shown in FIG. 3. This detector comprises, as has been indicated hereinabove, means 1 for emitting a convergent incident beam of monochromatic light, means 2 for receiving the light reflected on the surface, and an optoelectronic transducer 3 for this reflected light, associated with the receiving means 2. The means 1 for emitting the convergent incident beam of monochromatic light are constituted by a source 7 of coherent light, emitted in the form of a very slightly divergent beam presenting a high energy density per surface unit. This source may be constituted by a helium-neon type laser for example. The emission means also comprise means for focusing the light emitted by the source; these focusing means comprise, on the one hand, an assembly 8 for focusing the light emitted by the laser 7 on the core of an optic fibre 9 and, on the other hand, an assembly 10 for focusing the light on the surface. This focusing of the light is an important condition as the diameter of the incident beam must be as reduced as possible, so as not to exceed the width of the smallest join to be detected. The focusing means 8 and 10 have a focal distance which is determined by the diameter of the fibre and by the distance which separates the end of this fibre from the plane of measurement. These focusing means are constituted in known manner; their focal distance is adjustable so as to optimize the concentration of the light energy at the point of reflexion of the incident beam on the surface. The means 2 for receiving the light reflected on the surface are constituted by an interference filter so that the optoelectronic transducer 3 receives only a monochromatic light corresponding to the wave length of the light emitted by the laser, when the incident and reflected beams are disturbed by parasitic radiations; these radiations may be those of an electric arc when the detection system of the invention is used for detecting, for example, the join existing between two sheets to be welded. An optic fibre may possibly be interposed between the interferential filter and the surface, so as to guide the reflected beam up to this filter.

The means for receiving the reflected light may be surrounded by a protecting screen avoiding the radiation of the welding arc disturbing detection. They are not described in detail in the Figure.

The optoelectronic transducer 3 is a photodiode which ensures the conversion of the light energy of the reflected beam into electric energy. The optic fibre or fibres used in the system do not provoke any attenuation of power when the light is conveyed and when the detector scans the join transversly with respect to the lines which define it, these optic fibres have a high mechanical resistance to the vibrations of high amplitude and low frequency.

Figure 5:
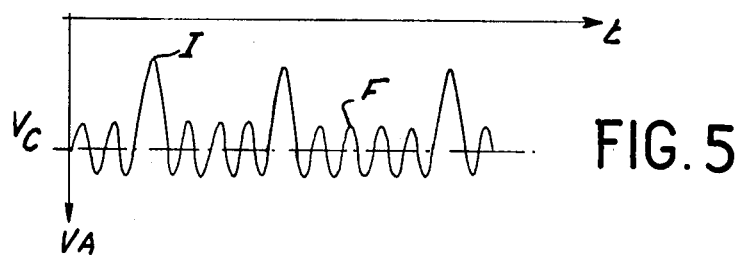
FIG. 5 is a diagram showing the output signal from the transducer belonging to the detector.

FIG. 5 is a diagram showing the amplitude $V_A$ of the output signal of the transducer, as a function of time, when the detector D transversely scans the discontinuity defined by two lines $B_1$ and $B_2$ or formed by a single line M. This signal contains pulses I of high amplitude, which correspond to the passages of the incident beam over the discontinuity; their frequency is double the scanning frequency of the detector; these pulses are accompanied by a background noise represented by parasitic signals whose amplitude and duration are variable depending on the defects and the state of the surface studied. In fact, this surface may present scratches or flaws which are manifested as a noise vis-à-vis the pulse passing over the discontinuity. The D.C. component $V_C$ corresponds to the mean reflexion of the incident beam on the sheet to be welded. The value of this D.C. component depends, of course, on the reflecting power of the surface studied.

Figure 6:
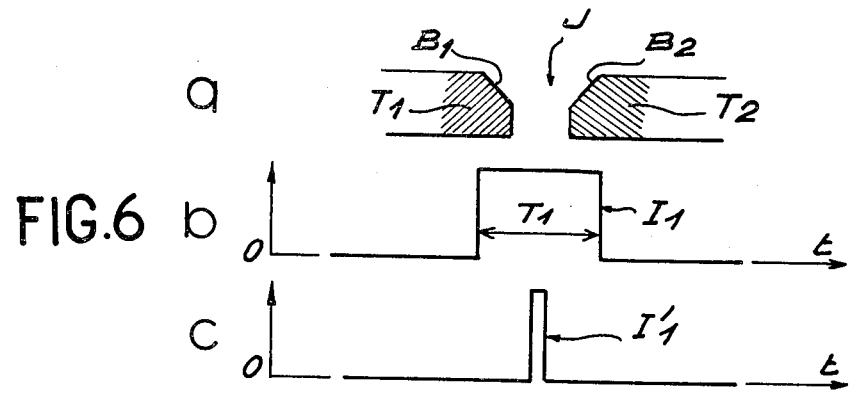
FIG. 6 shows at (a) a transverse section through a surface presenting a discontinuity defined by two lines, at (b) and (c) diagrams showing signals present at the output of certain means of the system.

FIG. 6 schematically shows at (a) a transverse section through the surface; this surface has a discontinuity J which divides it into two parts $T_1$, $T_2$ defined by lines $B_1$, $B_2$. Diagram (b) schematically shows pulses $I_1$ corresponding to the pulses I present in the output signal from the optoelectronic transducer; the pulses $I_1$ result from the recording and shaping of the pulses I, in appropriate means which form part of the system and which will be described in detail hereinafter. The variable duration $T_1$ of each pulse $I_1$ corresponds to the variable duration of each pulse I of FIG. 4; this duration is proportional to the distance separating the lines $B_1$, $B_2$ which define the discontinuity J. As will be seen hereinafter, this duration is not taken into account when the discontinuity is formed by a single line.

Diagram (c) of FIG. 6 shows one of the pulses $I'_1$ making it possible to locate half the duration $T_1$ of each pulse $I_1$ representing the width of the discontinuity J, when this discontinuity is defined by two lines $B_1$, $B_2$ distant from each other.

These pulses $I'_1$ make it possible, as will be seen hereinafter, to control the recording of the angular position of the detector with respect to the reference direction, when the incident beam passes through points located between, and at equal distance from the lines $B_1$, $B_2$ defining the discontinuity when the latter is very wide. It is obvious that a succession of pulses such as $I'_1$ is obtained in the system of the invention for each of the pulses corresponding to the crossing of the discontinuity by the incident beam issuing from the detector.

When the discontinuity is formed by a single line M, it is the pulses $I_1$ which make it possible to determine the angular positions of the detector with respect to the reference direction, when the incident beam passes through a joint of line M.

Figure 7:
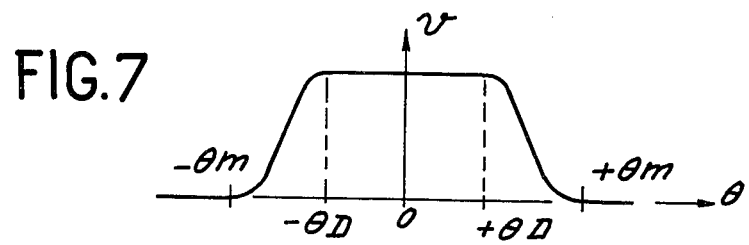
FIG. 7 is a diagram showing the speed of displacement of the detector, as a function of the angle made by the arm supporting the detector with a fixed reference direction, in the course of the scanning movement accomplished by the detector.

FIG. 7 is a diagram showing the variations in the speed v of the detector, as a function of angle $\theta$, between the direction of the detector and the reference direction, in the course of scanning of the discontinuity. This scannig movement is periodic and symmetrical with respect to the rest position of the detector, assumed to be merged with the reference direction x'x. In order to ensure a constant number of passages per unit of length of discontinuity, the frequency of the scanning movement is directly proportional to the speed of advance of the carrier. In the case of the discontinuity to be detected being a join between two sheets to be welded, this frequency may be 10 hertz for example, for a speed of advance of two meters per minute. By way of example, the minimum scanning frequency is 0.3 hertz for a minimum speed of advance equal to 1 mm/s. These frequencies are compatible with the movement in oscillation of a mass of a few hundreds of grams. The law of speed of the movement therefore imposes the drive torque necessary for scanning. This results in a purely sinusoidal law of the movement inducing acceleration of several g, when the directions of scanning are reversed, which is prohibitive; for a light detector such as the one described in the invention, which comprises optical and electronic components, the law of speed retained is the one shown in the Figure. This scanning speed is constant over a certain distance on either side of the rest position; near each end of path, the detector undergoes a deceleration. The deceleration zone is shown in the Figure by the positions $+\theta_D$ and $-\theta_D$, from which the acceleration of the movement of the detector is decreasing, up to the respective end positions $-\theta_m$ and $+\theta_m$.

FIG. 8 schematically shows a first embodiment of the means which allow the detector to be displaced so that the incident beam scans the discontinuity transversely, between the maximum angular positions $-\theta_m$ and $+\theta_m$, with respect to the reference direction x'x. In this first embodiment, the displacement of the detector is ensured due to a heart-shaped cam 11, rotated by a motor 12; this cam cooperates with a lever 13 for controlling the arm B supporting the detector. A roller 14 ensures mechanical contact between the cam 11 and the lever 13, which is pivoted at 15 on arm B. A return spring 16 maintains contact between the cam 11 and the roller 14. The detector D is, as has been seen hereinabove, supported by the arm B, and it is located on a line passing through a point M' characteristic of the position of the detector, and through a determined point P' of the carrier; this point P' corresponds for example to points $P_1$ and $P_2$ of FIGS. 1 and 2. The arm B is associated with the means which record the angular position $\theta$ of the detector, with respect to the reference direction x'x; as has been seen previously, these means are constituted in particular by a potentiometer R of which the slider C has a voltage $V_C$ proportional to the angle $\theta$ representing the angular position of the detector with respect to the reference direction x'x which passes through the centre point of the potentiometer R, taken to the reference potential MR. The references $-V$, $+V$ and MR indicate respectively in this Figure the potentials to which the ends and the slider of the potentiometer R are taken. It will be seen hereinafter how the angular position $\theta$ of the detector with respect to the reference direction x'x can be determined from the voltage $V_C$ when the incident beam of convergent light issuing from the detector passes through a point located between and at equal distance from the lines defining the discontinuity or through a point of this discontinuity. In the embodiment which has just been described, the law of the movement of the detector D is of course in accordance with the speed diagram shown in FIG. 7.

FIG. 9 shows another embodiment of the means for displacing the detector in a scanning movement transverse with respect to the discontinuity. In this other embodiment, the arm B which supports the detector D oscillates about the determined point P' of the carrier, due to the action of the means A; these means comprise an oscillating support 61, controlled by hydraulic jacks 17, 18. These jacks are supplied by a hydraulic circuit 19, connected to pistons 20, 21 which abut, via rollers 22, 23 on a bell-shaped cam 24, driven in rotation by a motor 25. The reciprocating movements of the pistons 20, 21 are communicated in phase to the hydraulic jacks 17,18 which, themselves, communicate this reciprocating movement to the oscillating support 61. Of course, the jacks 17, 18 may undergo a very slight rotation about their points of fixation 26, 27. As before, the angle $\theta$ made by the direction of the detector with respect to the reference direction x'x is located due to the slider C of the potentiometer R.

FIG. 10 shows another embodiment of the means A for displacing the detector in a reciprocating movement, transversely with respect to the discontinuity. According to this embodiment, the displacement means are of the "capstan" type. The arm B which supports the detector is fixed to a support 62 oscillating about point P', due to the action of a capstan 63 which transmits its movement to the support 62, via the cables 28,29. This capstan is driven by a motor 30, in a reciprocating movement, which enables the detector to follow a law of speed variation in accordance with that shown in FIG. 7. This law of speed variation is obtained by controlling the motor by a voltage in the form of a truncated saw-tooth and which is applied on the armature of the D.C. motor. As in the preceding embodiments, the angular position $\theta$ of the detector, with respect to the reference direction x'x, is obtained due to the potentiometer R which is not shown in detail in the Figure. In all the embodiments of means A, reference 4 represents the output of the optoelectronic transducer of the detector.

FIG. 11 schematically shows the means $R_2$ which, in connection with the potentiometer R and the slider C thereof, make it possible to determine the angular position of the detector, with respect to the fixed reference direction x'x, each time the incident beam passes through a point of the discontinuity. These means receive at 31 the signal coming from the output 4 of the transducer 3, and deliver on their output 32 a pulse $I'_1$, each time the incident beam issuing from the detector passes through a point of the discontinuity. It is these pulses which make it possible to locate the successive angular positions of the detector with respect to the fixed reference direction, when the carrier occupies different positions along the discontinuity. As has been seen previously, the output signal from the detector is formed by a succession of pulses I, of which the duration corresponds to the width of the discontinuity; each pulse I corresponds to the passage of the beam over the discontinuity. The means $R_2$ comprise means 33 which record the pulses coming from the detector 3 and means 34 for indicating by pulses $I'_1$ the instant corresponding to half the duration of each of the pulses I; the pulses $I'_1$ control means constituted in known manner which record, for each pulse $I'_1$, the value of the angle $\theta$ corresponding to the angular position of the detector; the value of this angle is proportional to the voltage $V_C$ taken at each pulse $I'_1$, on the slider C of the potentiometer R.

The means 33 for recording the pulses I coming from the detector 3 are constituted so as to deliver on their output 36 pulses $I_1$ of which the duration corresponds to that of pulses I, which duration indicates the distance separating the lines $B_1$ and $B_2$ which define the discontinuity. These means 33 comprise a circuit for shaping the pulses I, constituted by an amplifier 37 amplifying the signal issuing from the detector; this signal, which has been shown in FIG. 4, is the sum of the useful signal, the dark current of the transducer, daylight, and the parasitic light radiation and it depends on the power of reflexion of the sheets. The means 33 make it possible to eliminate the D.C. component of the signal issuing from the detector and to compare this signal with a floating reference D.C. voltage. To this end, the high gain amplifier 37 is associated with an assembly for filtering the background noise accompanying the pulses I. This filtering assembly comprises at least one filter 38 which is associated with means 39 for comparing the output signal of this filter with a floating reference D.C. voltage, corresponding to the mean level of the signal leaving this filter. The filter 38 is of the low-pass type and enables a signal indicating the noise accompanying the pulses I to be obtained on its output. A comparator 40 enables the signal present at the input 41 of the filter to be compared with its output signal 42. The output signal of this comparator is a signal idicating the difference between the useful signal and its mean value. This output signal is amplified in an amplifier 43, then detected due to a diode 44. The detected signal then passes through a low-pass filter 45 which "cleans" this detected signal by eliminating part of the parasites which accompany it. The output signal of the filter 45 is sent on the input of a filter 46, of the low-pass type, which enables the mean value of the detected signal to be obtained; the output signal of this filter is then indicative of the reflecting power of the surface treated by the system. After passage in an attenuator 47, the signal thus detected is added by the adder 48 to the output signal 42 of the filter 38. The output signal 49 from the adder 48 passes thereafter through an attenuator 50 which delivers at its output 51 a floating reference signal corresponding to the mean level of the background noise accompanying the useful signal. The output 51 of the attenuator 50 is connected to the input 52 of a comparator 53, which receives, on the other hand, on an input 54, the detected and filtered signal coming from the filter 45. The output 36 of the comparator 53 therefore delivers pulses $I_1$ of which the duration is a function of the duration of the pulses I present at the input 31, these pulses having all the parasitic signals removed therefrom.

The means 34 which enable the duration of the pulses registered by means 33 to be measured and for indicating the instant which corresponds to half this duration for each of these pulses, comprise a logic circuit 54, constituted in known manner, which receives, on its input 55, pulses $I_1$ coming from the comparator 53 and, on an input 56, pulses from a clock 57.

This logic circuit and this clock are associated with a counter 58 which takes into account all the clock pulses for the duration of each pulse $I_1$. It is obvious that the frequency of the clock pulses is much higher than the frequency of pulses $I_1$. The means 34 also comprise a register 59 and a comparator 60. This comparator 60 is connected, on the one hand, to the output of the counter 58 and, on the other hand, to the output of the register 59. The output of the counter 58 is also connected to an input 61 of the register 59.

The functioning of the means 34 for measuring the duration of each pulse and for indicating the instant corresponding to half this duration, will be more readily understood on referring to the diagram of FIG. 12. This diagram shows, as a function of time t, the succession of the pulses $I_1$ at the output 36 of the recording means 33. For two successive passages of the detector over the discontinuity, the centre of this discontinuity is located at the same distance with respect to the rising edge of the pulse $I_1$. Thus, on the diagram shown in the Figure, it is assumed that times $t_i$ and $t_{i+1}$ are equal for passages i and i+1 of the detector on the discontinuity. The appearance of the rising edge of pulse $I_1$ for passage i triggers off the counting of the clock pulses; this counting stops at the falling edge of this pulse $I_1$, for passage i. This triggering and stopping are effected due to the control signal delivered on the output 62 of the logic circuit 54. The contents of the counter for this passage i are then divided by 2, which makes it possible to obtain at the output of this counter a binary signal corresponding to half the clock pulses counted during the life of the pulse $I_1$ at passage i. This binary configuration corresponding to time $t_i$ of passage i is recorded in the register 59. The counter is then returned to 0 after this recording. The appearance of the rising edge corresponding to pulse $I_1$ of passage i+1 again triggers off the counter. The contents of this counter are then compared with the contents $t_i$ of the register; when the contents of the counter during passage i+1 are equal to the contents of the register, i.e. to the binary value $t_i$ corresponding to half the duration of the passage i, the comparator delivers a pulse $I'_1$ which will control the means 35 for recording the angular value of the position of the detector with respect to the reference position x'x. Counting is nonetheless not stopped and it stops only upon appearance of the falling edge of the pulse $I_1$ corresponding to passage i+1. The contents of the counter are then divided by two and it is time $t_{i+1}$ corresponding to half the duration of passage i+1 which is then recorded in the register. The contents of the counter, upon passage i+2 are then compared with time $t_{i+1}$. The process is repeated in the same way for all the other pulses $I_3$ coming from the comparator 53.

Thus, the means $R_1$ which control the displacement of the carrier and which record the coordinates X, Y of the different positions of the carrier along the discontinuity, also make it possible to record, in relation with these coordinates, the angular position of the detector with respect to the reference direction for each of these coordinates. The values of these angular positions are furnished by the recording means 35 giving the angular value of the direction of the carrier, with respect to the reference direction x'x. The recording means 35 may be constituted by known logic circuits which, for each pulse $I'_1$, control recording in in $R_1$ of the voltage $V_C$ of the slider of the potentiometer R. In fact, this voltage is proportional at each instant to the value of the angle between the direction of the detector and the reference direction.

In the event of the discontinuity to be detected being constituted by a single line on the surface, the system of the invention comprises only the means 33 which record the pulses I coming from the detector 3, and the recording means 35 which give the angular value of the direction of the detector, with respect to the reference direction x'x. In this case, the means 35 are controlled directly by the pulses $I_1$ delivered on the output 36 of the means 33. In fact, since the discontinuity is reduced to a single line, it is not necessary to detect, as before, the centre of this discontinuity to determine the form thereof. The pulses I delivered by the detector are of short duration and it is at the instant when each of these pulses occurs that the angular position of the detector is to be located. This results in the system of the invention being simplified, in this application.

It is obvious that, in the system which has just been described, the means used may be replaced by equivalent means without departing from the scope of the invention.

What is claimed is:

1. System for detecting and locating surface discontinuity by a light beam, comprising:
   a detector comprising means for emitting a convergent incident beam of monochromatic light, in the direction of the discontinuity, means for receiving the light reflected on the surface and an optoelectronic transducer for the reflected light, associated with the receiving means;
   means for displacing the detector so that the incident beam transversely scans the discontinuity and the vicinity thereof;
   a carrier adapted to move the means for displacing the detector, along the discontinuity, this carrier being associated with means for locating its position with respect to a fixed system of coordinates;
   locating means, connected to the receiving means of the detector, for locating the successive angular positions of this detector, with respect to a reference direction associated with the carrier, when this carrier occupies different positions along the discontinuity and when the incident beam passes over the discontinuity;

wherein the means for locating each angular position of the detector comprise means for determining the angular position of the detector with respect to said reference direction, each time the incident beam passes through a point located on the discontinuity;

wherein the means for determining the angular position of the detector each time the incident beam passes through a said point located on the discontinuity, comprise means for recording each pulse coming from the optoelectronic transducer and means for recording, for each of these pulses, the value of the angle between a detector position locating line and said reference direction, this detector position locating line passing through a determined point of the carrier and through a point of the detector, characteristic of the position of the detector;

wherein the means for recording each pulse comprise a circuit for shaping these pulses;

wherein the shaping circuit comprises a high gain amplifier, associated with an assembly for filtering the background noise accompanying these pulses; and wherein the filtering assembly comprises at least one filter associated with means for comparing the output signal from this filter with a floating reference D.C. voltage corresponding to the means level of the signal leaving the filter.

2. System for detecting and locating surface discontinuity by a light beam, comprising:

a detector comprising means for emitting a convergent incident beam of monochromatic light, in the direction of the discontinuity, means for receiving the light reflected on the surface and an optoelectronic transducer for the reflected light, associated with the receiving means;

means for displacing the detector so that the incident beam transversely scans the discontinuity and the vicinity thereof;

a carrier adapted to move the means for displacing the detector, along the discontinuity, this carrier being associated with means for locating its position with respect to a fixed system of coordinates;

locating means, connected to the receiving means of the detector, for locating the successive angular positions of this detector, with respect to a reference direction associated with the carrier, when this carrier occupies different positions along the discontinuity and when the incident beam passes over the discontinuity;

wherein the means for locating each angular position of the detector comprise means for determining the angular position of the detector with respect to said reference direction, each time the incident beam passes through a point located on the discontinuity;

wherein the means for determing the angular position of the detector each time the incident beam passes through a said point located on the discontinuity, comprise means for recording each pulse coming from the optoelectronic transducer and means for recording, for each of these pulses, the value of the angle between a detector position locating line and said reference direction, this detector position locating line passing through a determined point of the carrier and through a point of the detector, characteristic of the position of the detector;

wherein, the discontinuity being defind by two opposite lines, the means for locating each angular position of the detector comprise means for determining the angular position of the detector with respect to said reference direction, each time the incident beam passes through a point located in the space separating the lines defining the discontinuity;

wherein the means for determining the angular position of the detector, each time the incident beam passes through a said point located in the space separating the two lines defining the discontinuity, comprise means for recording each pulse coming from the optoelectronic transducer, these pulses having a duration corresponding to the passage of the incident beam in the space separating two lines defining the discontinuity, means for measuring the duration of each of these pulses, means for indicating the instant which corresponds to half of this duration and therefore to the passage of the incident beam through a point located between and at equal distances from the two lines defining the discontinuity, and means for recording at that instant the value of the angle between a line for locating the position of the detector and said reference direction, this detector position locating line passing through a determined point of the carrier and through a point of the detector, characteristic of the position of the detector; and wherein the means for measuring the duration of each pulse of the transducer and for indicating the instant corresponding to half this duration, comprise a clock associated with a counter and with a logic circuit controlling the counting of the clock pulses for the duration of each pulse of the transducer, an output of this counter delivering a binary signal corresponding to half the number of the clock pulses counted during said duration.

3. The system of claim 2, wherein the means for measuring the duration of each pulse and for indicating the instant corresponding to half this duration further comprise a register adapted to record the binary signal corresponding to half the number of the clock pulses counted during said duration, a comparator receiving on the one hand the contents of the register and, on the other hand, the following binary signal issuing from the counter and corresponding to the clock pulses counted during the duration of the following pulse, for another passage of the incident beam of the detector, in the space separating the two lines defining the discontinuity, an output of this comparator delivering a control pulse and means for recording the value of said angle.

4. The system defined in claims 1, 2 or 3, wherein the detector is fixed to an arm mobile with respect to the carrier, this arm being controlled by said displacement means and having such a form that the detector is located on a line passing through said point characteristic of the position of the detector and through said determined point of the carrier, this arm further being associated with the means for recording said angle.

5. The system defined in claims 1, 2 or 3 wherein the means for emitting the incident beam comprise a laser source, means for focusing the beam emitted by the source, an optic fibre associated with these focusing means and adapted to direct the focused beam at a constant angle of incidence in the vicinity of the or each line defining the discontinuity, the receiving means comprising means for focusing the reflected light corresponding to the incident beam, and an interference filter interposed between the surface and the optoelectronic transducer, the optic axis of the means for focusing the reflected light from the interference filter and the transducer presenting an angle of relfexion equal to the angle of incidence.

6. The system of claim 5, wherein an optic fibre is interposed between the means for focusing the reflected light and the interference filter.

7. The system of claim 5, wherein the means for displacing the detector so as to effect said scanning comprise a lever for controlling the arm supporting the detector cooperating with a heart-shaped cam rotated so as to provoke a reciprocating movement of the arm.

8. The system of claim 5, wherein the means for displacing the detector so as to effect said scanning comprise hydraulic means for controlling a reciprocating movement of the arm supporting the detector.

9. The system of claim 5, wherein the means for displacing the detector so as to effect said scanning comprise an assembly of the "capstan" type, controlling the reciprocating movement of the arm.

* * * * *